US010622006B2

(12) United States Patent
Jalali et al.

(10) Patent No.: US 10,622,006 B2
(45) Date of Patent: Apr. 14, 2020

(54) MECHANISM AND INSTRUMENTATION FOR METERING CONVERSATIONS

(71) Applicant: Futurewei Technologies, Inc., Plano, TX (US)

(72) Inventors: Leila Jalali, Santa Clara, CA (US); Masood Mortazavi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 253 days.

(21) Appl. No.: 15/598,162

(22) Filed: May 17, 2017

(65) Prior Publication Data

US 2018/0336915 A1 Nov. 22, 2018

(51) Int. Cl.
| | | |
|---|---|---|
| *G10L 21/10* | (2013.01) | |
| *G10L 15/02* | (2006.01) | |
| *G10L 21/16* | (2013.01) | |
| *G10L 25/90* | (2013.01) | |
| *G10L 25/51* | (2013.01) | |
| *G10L 17/00* | (2013.01) | |
| *H04L 12/18* | (2006.01) | |
| *G10L 25/48* | (2013.01) | |
| *G10L 25/03* | (2013.01) | |

(52) U.S. Cl.
CPC .............. *G10L 21/10* (2013.01); *G10L 15/02* (2013.01); *G10L 17/005* (2013.01); *G10L 21/16* (2013.01); *G10L 25/48* (2013.01); *G10L 25/51* (2013.01); *H04L 12/1831* (2013.01); *G10L 25/03* (2013.01); *G10L 25/90* (2013.01); *G10L 2025/906* (2013.01)

(58) Field of Classification Search
CPC ......... G10L 21/10; G10L 25/48; G10L 15/02; G10L 25/51; G10L 21/16; G10L 17/005; G10L 25/03; G10L 2025/906; G10L 25/90; H04L 12/1831
USPC ....................................................... 704/270
See application file for complete search history.

(56) References Cited

U.S. PATENT DOCUMENTS 8,086,462 B1 * 12/2011 Alonso ................. G06Q 30/02
  379/88.01
9,418,661 B2 * 8/2016 Fay .......................... G10L 15/22
(Continued)

FOREIGN PATENT DOCUMENTS

CN    106468997 A    3/2017
WO    WO-2011045637 A1    4/2011

OTHER PUBLICATIONS

"International Application No. PCT/CN2018/087087, International Search Report dated Aug. 6, 2018", (Aug. 6, 2018), 4 pgs.
(Continued)

*Primary Examiner* — Edwin S Leland, III
(74) *Attorney, Agent, or Firm* — Schwegman Lundberg & Woessner, P.A.

(57) ABSTRACT

A conversation meter comprises a memory storage comprising instructions and one or more processors in communication with the memory storage. The one or more processors execute the instructions to perform: accessing audio data representing a conversation among a plurality of people; analyzing the audio data to associate one or more portions of the audio data with each person of the plurality of people; analyzing the portions of the audio data to determine one or more conversation metrics for each person of the plurality of people; and causing presentation of at least one of the determined conversation metrics.

18 Claims, 18 Drawing Sheets

(56) References Cited

U.S. PATENT DOCUMENTS

| | | | | |
|---|---|---|---|---|
| 9,548,046 | B1* | 1/2017 | Boggiano | G10L 15/05 |
| 9,720,978 | B1* | 8/2017 | Peterson | G06F 16/93 |
| 9,875,740 | B1* | 1/2018 | Kumar | G10L 15/30 |
| 2008/0012701 | A1* | 1/2008 | Kass | A61B 5/0002 340/539.11 |
| 2009/0103709 | A1* | 4/2009 | Conway | H04M 3/42221 379/265.09 |
| 2012/0246669 | A1* | 9/2012 | Basson | G10L 17/26 725/10 |
| 2013/0172693 | A1* | 7/2013 | Ohana Lubelchick | G06F 19/3481 600/301 |
| 2016/0249842 | A1* | 9/2016 | Ohana Lubelchick | A61B 5/165 704/237 |
| 2016/0316059 | A1* | 10/2016 | Nuta | H04M 3/5175 |
| 2016/0381226 | A1* | 12/2016 | Messenger | H04W 76/10 455/413 |
| 2017/0078479 | A1* | 3/2017 | Feast | H04M 3/2281 |
| 2018/0018986 | A1* | 1/2018 | Zass | G06K 9/00369 |
| 2018/0336915 | A1* | 11/2018 | Jalali | H04L 12/1831 |
| 2019/0130910 | A1* | 5/2019 | Kariya | G10L 15/02 |
| 2019/0180753 | A1* | 6/2019 | Raja | G10L 15/26 |
| 2019/0221320 | A1* | 7/2019 | Amini | G16H 20/00 |

OTHER PUBLICATIONS

Anguera, Xavier, et al., "Robust Speaker Segmentation for Meetings: The ICSI-SRI Spring 2005 Diarization System", *International Workshop on Machine Learning for Multimodal Interaction, MLMI 2005: Machine Learning for Multimodal Interaction*, (2005), 13 pgs.

Batrinca, Ligia, et al., "Cicero—Towards a Multimodal Virtual Audience Platform for Public Speaking Training", *International Workshop on Intelligent Virtual Agents IVA 2013: Intelligent Virtual Agents*, (2013), 13 pgs.

Hincks, Rebecca, "Computer support for learners of spoken English", Doctoral Thesis, Stockholm, Sweden, (2005), 193 pgs.

Mairesse, Francois, et al., "Using Linguistic Cues for the Automatic Recognition of Personality in Conversation and Text", *Journal of Artificial Intelligence Research*, 30, (2007), 457-500.

Miro, Xavier Anguera, "Robust Speaker segmentation and clustering for Meetings", (PhD Thesis Proposal), TALP Research Center, Universitat Polit'ecnica de Catalunya, Campus Nord, Barcelona, Spain, (Mar. 2005), 22 pgs.

Reynolds, Douglas, "The SuperSID Project: Exploiting High-level Information for High-accuracySpeaker Recognition", *Proceedings 2003 IEEE International Conference on Acoustics, Speech, and Signal Processing*, 2003. (ICASSP '03), (2003), 4 pgs.

Shriberg, Elizabeth, et al., "Observations on Overlap: Findings and Implications for Automatic Processing of Multi-Party Conversation", *In: Proc. European Conf. on Speech Communication and Technology*, (2001), 4 pgs.

Strangert, Eva, "What Makes a Good Speaker? Subject Ratings, Acoustic Measurements and Perceptual Evaluations", *Proceedings of the Annual Conference of the International Speech Communication Association, INTERSPEECH*, (2008), 1688-1691.

Tur, G., et al., "The Calo Meeting Speech Recognition and Understanding System", *Proceedings 2008 IEEE Workshop on Spoken Language Technology Workshop (SLT 2008)*, (2008), 4 pgs.

Weintraub, Michael, et al., "Improved Keyword-Spotting Using SRI's Decipher tm Large-Vocabuarly Speech-Recognition System", *Proceedings of the workshop on Human Language Technology (HLT '93)*, (1993), 114-118.

Yuan, Jiahong, et al., "Towards an Integrated Understanding of Speaking Rate in Conversation", *Interspeech 2006*, (2006), 4 pgs.

Zeng, Fan-Gang, et al., "Speech recognition with amplitude and frequency modulations", *Proc. Natl. Acad. Sci. USA* 102(7), (2005), 2293-2298.

\* cited by examiner

1100

VOCAL VARIETY
(PITCH VARIATION QUOTIENT)

PERSON1

PERSON2

PERSON3

PERSON4

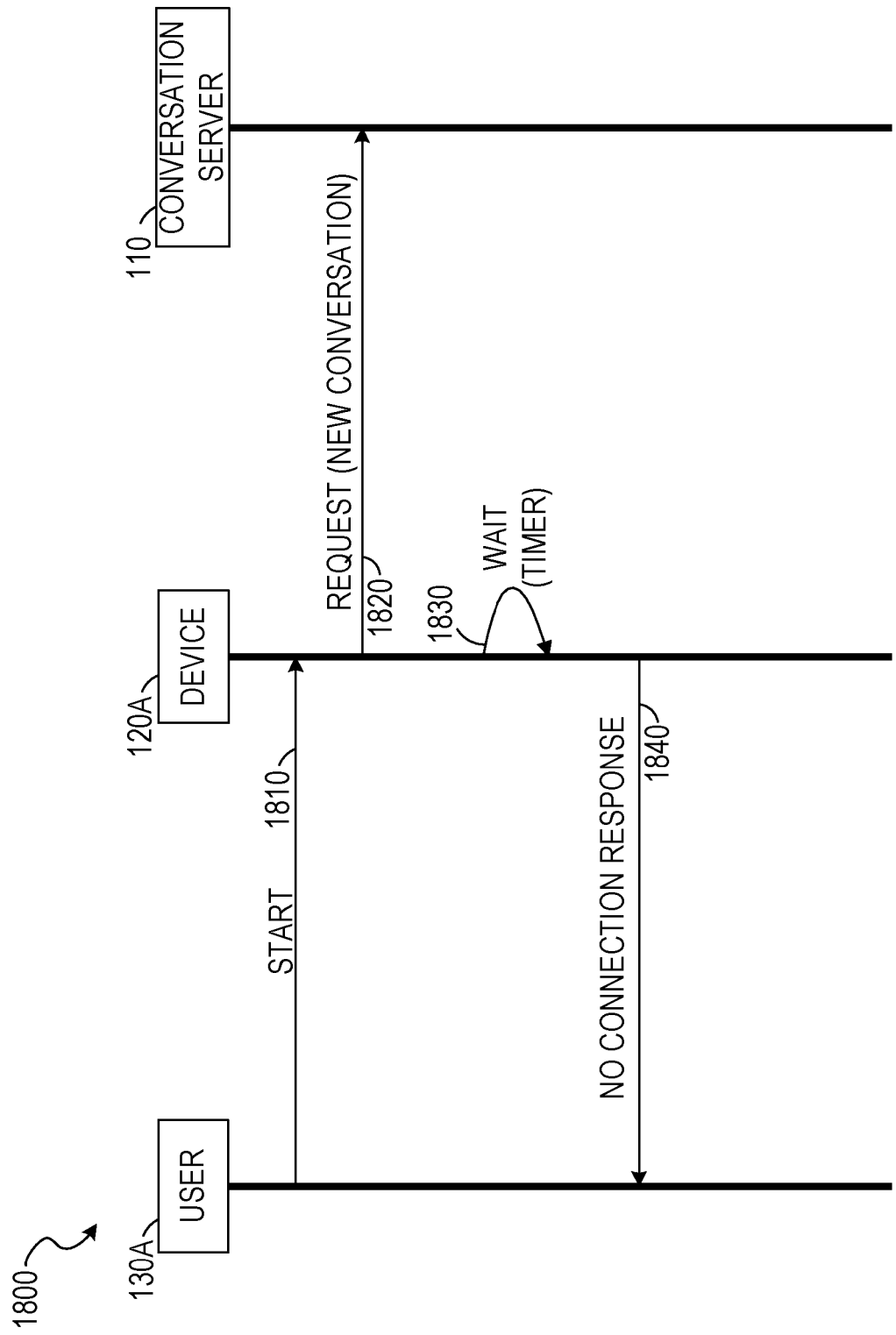

MECHANISM AND INSTRUMENTATION FOR METERING CONVERSATIONS

TECHNICAL FIELD

The present disclosure is related to speech processing and analysis and, in particular, to a mechanism and instrumentation for metering conversations.

BACKGROUND

Speech analysis tools analyze recordings of speech to identify features of the recorded speech such as average vocal volume, speaking rate, vocal variety, and person emotion. Person recognition and segmentation tools analyze recordings of speech to recognize people and partition the recording among the recognized people.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a conversation meter comprises: a memory storage comprising instructions; and one or more processors in communication with the memory storage, wherein the one or more processors execute the instructions to perform: accessing audio data representing a conversation among a plurality of people; analyzing the audio data to associate one or more portions of the audio data with each person of the plurality of people; analyzing the portions of the audio data to determine one or more conversation metrics for each person of the plurality of people; and causing presentation of at least one of the determined conversation metrics.

Optionally, in any of the preceding aspects, the causing of the presentation of the at least one of the determined conversation metrics comprises: causing a first device associated with a first person of the plurality of people to present the at least one of the determined conversation metrics for the first person; and causing a second device associated with a second person of the plurality of people to present the at least one of the determined conversation metrics for the second person.

Optionally, in any of the preceding aspects, the causing of the presentation of the at least one of the determined conversation metrics comprises causing presentation of a comparison of a first determined conversation metric for each person of the plurality of people.

Optionally, in any of the preceding aspects, the causing of the presentation of the at least one of the determined conversation metrics comprises generating haptic feedback on a wearable device.

Optionally, in any of the preceding aspects, the analyzing of the portions of the audio data to determine the one or more conversation metrics comprises rating topic maintenance.

Optionally, in any of the preceding aspects, the analyzing of the portions of the audio data to determine the one or more conversation metrics comprises determining a participation percentage.

Optionally, in any of the preceding aspects, the analyzing of the portions of the audio data to determine the one or more conversation metrics comprises determining an interrupt count.

Optionally, in any of the preceding aspects, the analyzing of the portions of the audio data to determine the one or more conversation metrics comprises determining an average vocal volume.

Optionally, in any of the preceding aspects, the analyzing of the portions of the audio data to determine the one or more conversation metrics comprises determining a speaking rate.

Optionally, in any of the preceding aspects, the analyzing of the portions of the audio data to determine the one or more conversation metrics comprises determining a vocal confidence.

Optionally, in any of the preceding aspects, the analyzing of the portions of the audio data to determine the one or more conversation metrics comprises determining a vocal variety.

Optionally, in any of the preceding aspects, the analyzing of the portions of the audio data to determine the one or more conversation metrics comprises determining a number of predefined keywords.

Optionally, in any of the preceding aspects, the accessing of the audio data representing the conversation occurs during the conversation.

According to one aspect of the present disclosure, a computer-implemented method of metering a conversation comprises: accessing, by one or more processors, audio data representing a conversation among a plurality of people; analyzing, by the one or more processors, the audio data to associate one or more portions of the audio data with each person of the plurality of people; analyzing, by the one or more processors, the portions of the audio data to determine one or more conversation metrics for each person of the plurality of people; and causing, by the one or more processors, presentation of at least one of the determined conversation metrics.

Optionally, in any of the preceding aspects, the causing of the presentation of the at least one of the determined conversation metrics comprises: causing a first device associated with a first person of the plurality of people to present the at least one of the determined conversation metrics for the first person; and causing a second device associated with a second person of the plurality of people to present the at least one of the determined conversation metrics for the second person.

Optionally, in any of the preceding aspects, the causing of the presentation of the at least one of the determined conversation metrics comprises causing presentation of a comparison of a first determined conversation metric for each person of the plurality of people.

Optionally, in any of the preceding aspects, the causing of the presentation of the at least one of the determined conversation metrics comprises generating haptic feedback on a wearable device.

Optionally, in any of the preceding aspects, the analyzing of the portions of the audio data to determine the one or more conversation metrics comprises rating topic maintenance.

Optionally, in any of the preceding aspects, the analyzing of the portions of the audio data to determine the one or more conversation metrics comprises determining a participation percentage.

According to one aspect of the present disclosure, there is provided a non-transitory computer-readable medium that stores computer instructions for metering a conversation that, when executed by one or more processors, cause the one or more processors to perform steps of: accessing audio data representing a conversation among a plurality of people; analyzing the audio data to associate one or more portions of the audio data with each person of the plurality of people; analyzing the portions of the audio data to determine one or more conversation metrics for each person of the plurality of people; and causing presentation of at least one of the determined conversation metrics.

Any one of the foregoing examples may be combined with any one or more of the other foregoing examples to create a new embodiment within the scope of the present disclosure.

BRIEF DESCRIPTION OF THE DRAWINGS

FIG. 18 is a communication diagram for a method of metering conversations, according to some example embodiments.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor (DSP), application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

A conversation meter monitors and evaluates the quality of conversation among people. The conversation meter may provide real-time analysis and feedback during a conversation, provide analysis and feedback of a conversation after the conversation is complete, or both. The conversation meter may generate results for each of the people in the conversation as individuals, for each of the people in the conversation in relation to the conversation as a whole, or any suitable combination thereof. Conversation metrics provided by the conversation meter may include any comparative or absolute measure of the conversation, either as a whole or with regard to the contributions by individual people. Example conversation metrics include metrics for interruptions, participation, vocal volume, talk time, speaking rate, vocal confidence, vocal variety, keywords, and topic maintenance.

Figure 1:
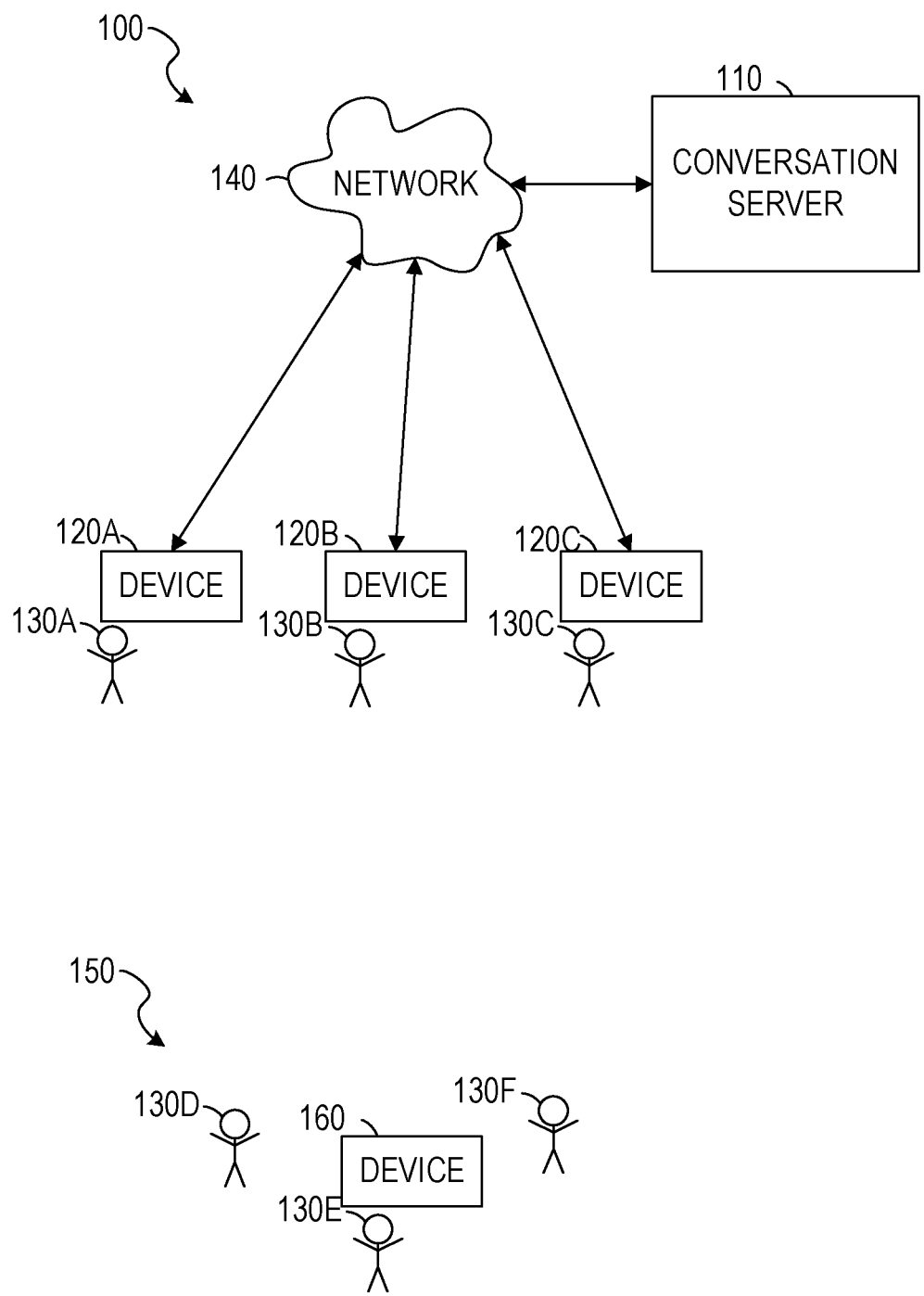
FIG. 1 is a block diagram illustration of networked and non-networked devices for metering conversations, according to some example embodiments.

FIG. 1 is a block diagram illustration of networked and non-networked devices for metering conversations, according to some example embodiments. FIG. 1 shows a configuration 100 and a configuration 150. The configuration 100 includes a conversation 110, devices 120A, 120B, and 120C associated with users 130A, 130B, and 130C and connected to the conversation server 110 via a network 140. The configuration 150 includes a device 160 associated with users 130D, 130E, and 130F. The devices 120A-120C may be collectively referred to as devices 120 or generically referred to as a device 120. The users 130A-130F may be collectively referred to as users 130 or generically referred to as a user 130.

In the configuration 100, each user 130A-130C is associated with one of the devices 120A-120C. For example, the devices 120A-120C may be smartphones, tablets, or laptop computers of the users 130A-130C. One or more of the devices 120A-120C may record a conversation among the users 130A-130C and transmit audio data representing the conversation to the conversation server 110 via the network 140. The conversation server 110 may analyze the audio data to generate one or more conversation metrics for each of the users 130A-130C. The conversation metrics for each user 130 are transmitted to the device 120 of the user via the network 140. Each device 120 displays information for the corresponding user 130. For example, an indication of the participation percentage for each user 130 may be presented on the user's device 120.

In the configuration 150, the single device 160 records a conversation between the users 130D-130F. The device 160 analyzes audio data representing the conversation to generate one or more conversation metrics for each of the users 130D-130F. The conversation metrics for each user 130 may be presented on the device 160. For example, an indication of the participation percentage for each user 130 may be presented on the shared device 160.

In some example embodiments, the device 160 is in communication with the conversation server 110 via the network 140. In other example embodiments, the devices 120A-120C perform some or all of the conversation analysis locally. Other possible configurations are also contemplated and are within the scope of the present disclosure.

Figure 2:
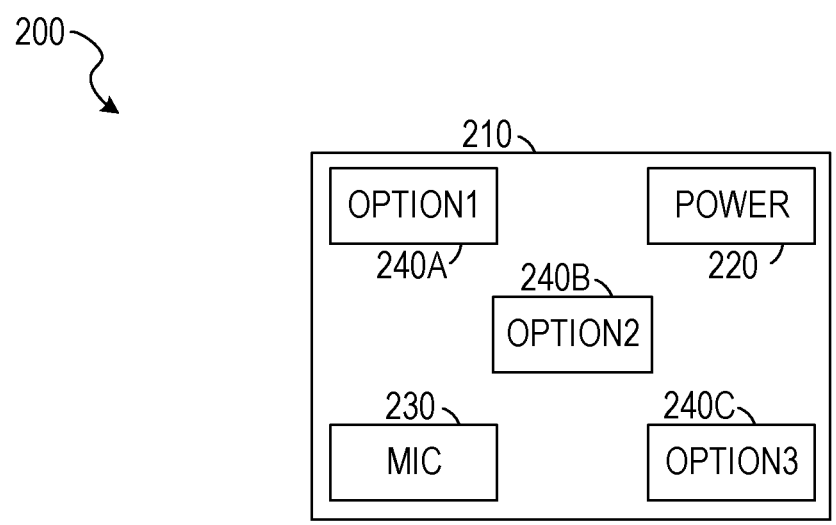
FIG. 2 is a block diagram illustration of a user interface of a device for metering conversations, according to some example embodiments.

FIG. 2 is a block diagram illustration 200 of a user interface 210 of a device for metering conversations, according to some example embodiments. The user interface 210 may be integrated into a dedicated conversation monitoring device or presented on a general-purpose computing device. The user interface 210 includes buttons 220, 230, 240A, 240B, and 240C. The button 220 may be operable to turn the device on and off. The button 230 may be operable to activate and deactivate a microphone of the device.

Each of the buttons 240A-240C may be associated with a different conversation metric. For example, the button 240A may be associated with interrupt frequency, the button 240B may be associated with participation percentage, and the button 240C may be associated with vocal volume. In various example embodiments, more or fewer buttons 240A-240C are used. The buttons 240A-240C may be operable to cause the device to present information associated with the associated conversation metric, to cause the device to change a setting regarding the associated conversation metric, or any suitable combination thereof.

In some example embodiments, the device for metering conversations is voice controlled. For example, a microphone of the device may detect speech in the environment to determine if the words "start metering" are detected and begin conversation recording in response.

Figure 3:
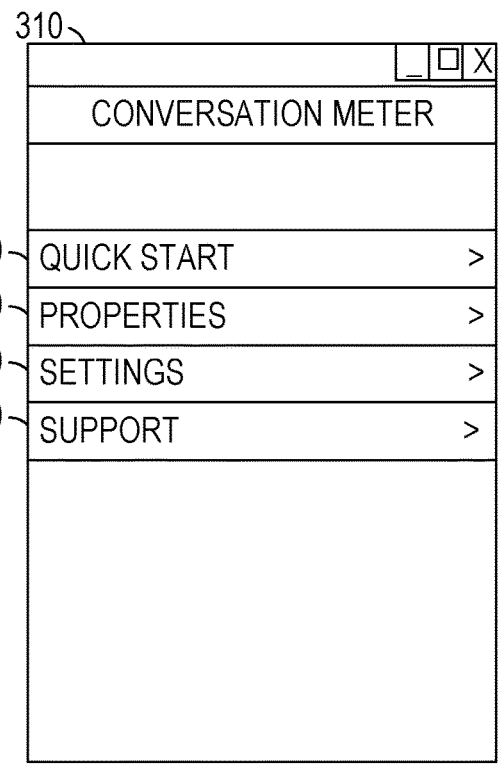
FIG. 3 is a block diagram illustration of user interfaces of a device for metering conversations, according to some example embodiments.
Figure 3:
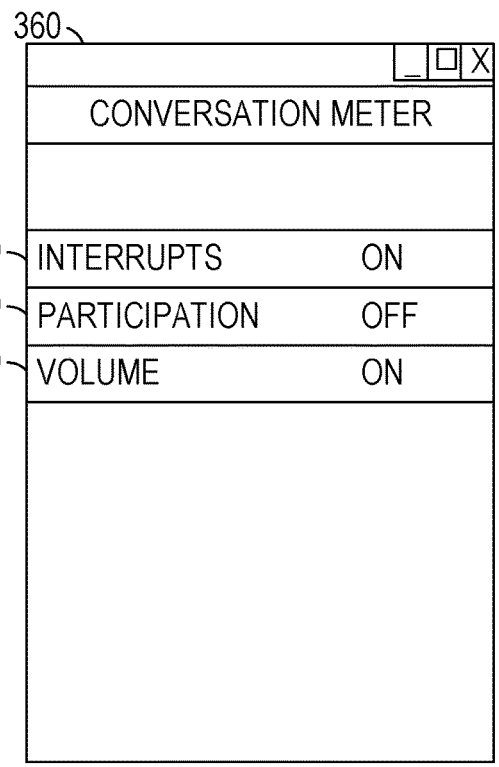

FIG. 3 is a block diagram illustration 300 of user interfaces 310 and 360 of a device for metering conversations, according to some example embodiments. The user interface 310 includes elements 320, 330, 340, and 350. The user interface 360 includes elements 370, 380, and 390. The user interfaces 310 and 360 are graphical user interfaces, but other types of user interfaces (e.g., command-line user interfaces, menu driven user interfaces, form based user interfaces, or natural language user interfaces) are within the scope of the present disclosure.

Each of the elements 320-350 of the user interface 310 may be operable to cause display of a user interface related to the option. For example, the element 320 may be operable to cause display of a "quick start" user interface that includes a simplified set of options to allow a user to quickly begin metering a conversation.

The element 330 may be operable to cause display of a user interface that includes information about the conversation meter. The element 340 may be operable to cause display of a user interface that includes option settings for the conversation meter (e.g., the user interface 360 or the user interface 510 of FIG. 5). The element 350 may be operable to cause display of a user interface that includes helpful information about the use of the conversation, contact information for a manufacturer of the conversation meter, contact information for a provider of conversation metering software, or any suitable combination thereof.

The user interface 360 may be displayed in response to operation of the element 340 of the user interface 310. The user interface 360 includes setting information for the conversation meter. As displayed in FIG. 3, the element 370 displays the current status of interrupt metering, the element 380 displays the current status of participation percentage metering, and the element 390 displays the current status of vocal volume metering. Detection with a user interaction (e.g., touching, pressing, or clicking) with any one of the elements 370-390 may cause the conversation meter to toggle the current status of the corresponding conversation metric.

Figure 4:
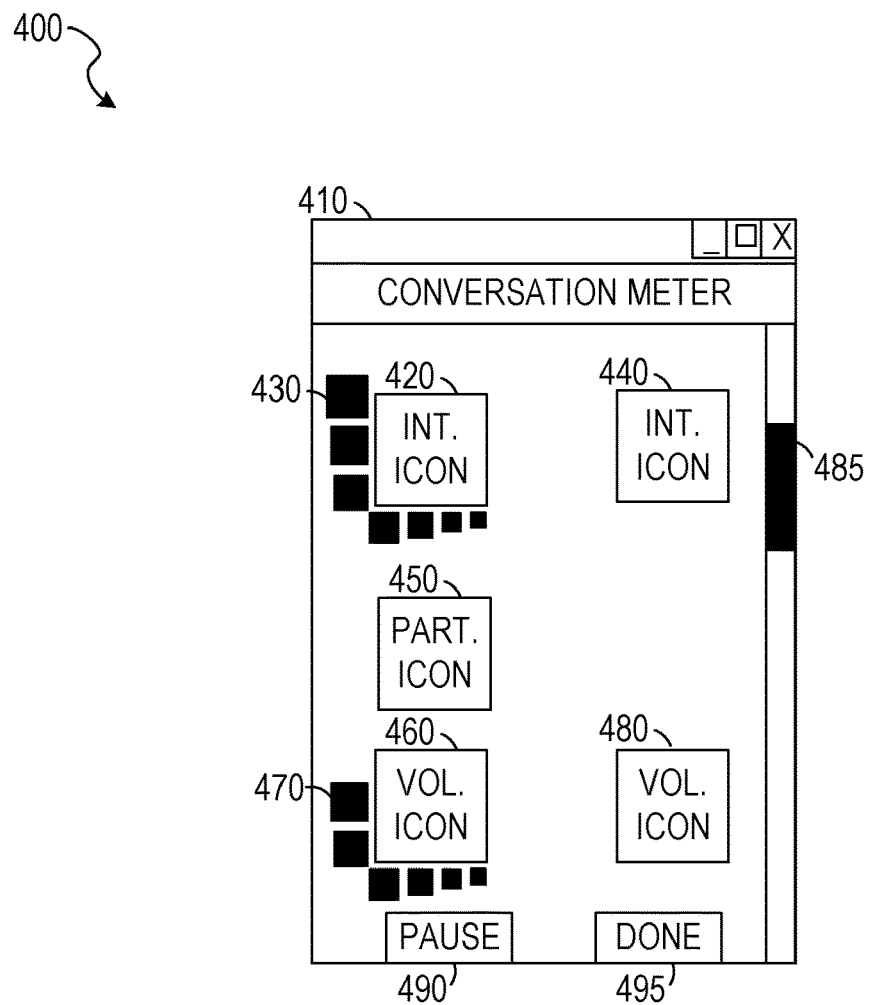
FIG. 4 is a block diagram illustration of a user interface of a device for metering conversations, according to some example embodiments.

FIG. 4 is a block diagram illustration 400 of a user interface 410 of a device for metering conversations, according to some example embodiments. The user interface 410 includes icons 420, 440, 450, 460, and 480, circle-bar indicators 430 and 470, a scroll bar 485, and buttons 490 and 495. The user interface 410 is a graphical user interface, but other types of user interfaces are within the scope of the present disclosure.

The icons 420 and 440, labeled "int. icon," are icons associated with an interrupt metric. The icon 450, labeled "part. icon," is an icon associated with a participation matric. The icons 460 and 480 are icons associated with a vocal volume metric. The icon 420 is surrounded by the circle-bar indicator 430 that indicates the current status of the associated interrupt metric. The icon 460 is surrounded by the circle-bar indicator 470 that indicates the current status of the associated vocal volume metric. In some example embodiments, the circle-bar indicators 430 and 470 are color-coded in a color associated with the metric of the icons 420 and 440. For example, the interrupt metric may be associated with yellow and the vocal volume metric may be associated with the color red. Accordingly, the circle-bar indicators 430 and 470 may be presented in yellow and red, respectively. Information for more, fewer, or different conversation metrics may be presented in the user interface 410. For example, the scroll bar 485 may be used to scroll the user interface 410 and allow the user to see information for conversation metrics that are hidden.

The icons 420, 450, and 460 may be operable to toggle the processing of the conversation metric associated with the icon. For example, touching, clicking, or pressing the icon 420 may cause the processing of the interrupt conversation metric to be toggled. The presence of the icons 440 and 480 may indicate that the conversation metric associated with each of the icons 440 and 480 is enabled. Similarly, the absence of an icon to the right of the icon 450 may indicate that the conversation metric associated with the icon 450 is disabled. Thus, as shown in the example user interface 410, the interrupt and vocal volume conversation metrics are enabled and the participation conversation metric is disabled.

The button 490 is operable to pause the recording and processing of the conversation. In some example embodiments, pressing the button 490 a second time causes recording and processing of the conversation to resume. The button 495 is operable to close the user interface 410.

Figure 5:
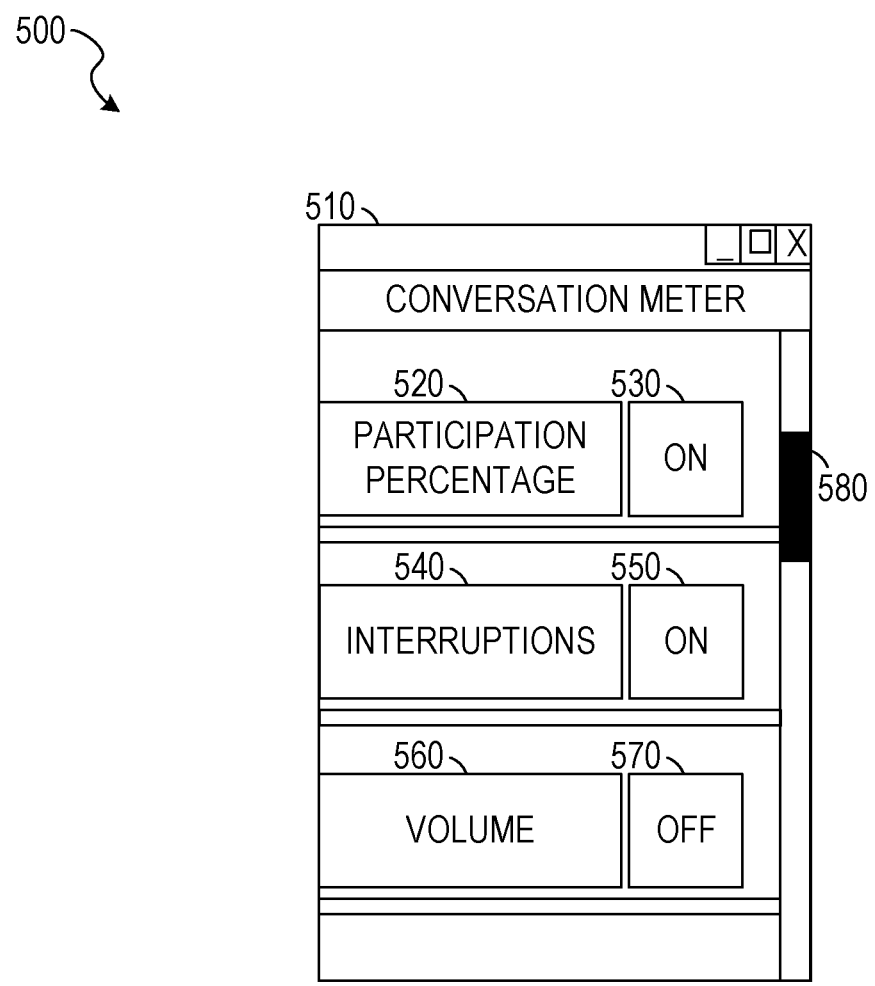
FIG. 5 is a block diagram illustration of a user interface of a device for metering conversations, according to some example embodiments.

FIG. 5 is a block diagram illustration 500 of a user interface 510 of a device for metering conversations, according to some example embodiments. The user interface 510 may be displayed in response to operation of the element 340 of FIG. 3. The user interface 510 includes labels 520, 540, and 560, text indicators 530, 550, and 570, and a scroll bar 580. The labels and text indicators are grouped into sets of elements, with one set for each conversation metric, with one label and one text indicator in each set. The user interface 510 is a graphical user interface, but other types of user interfaces are within the scope of the present disclosure.

Each of the labels 520, 540, and 560 identifies an associated conversation metric for the set of elements. Each of the text indicators 530, 550, and 570 indicates whether a notification for the conversation metric identified by the corresponding label is enabled. In some example embodiments, the text indicators 530, 550, and 570 are operable to toggle the status of the corresponding notification. When the notification for a conversation metric is enabled, notifications are generated when the difference between the value of the conversation metric for a person and an ideal value of the conversation metric exceeds a threshold. For example, the ideal value for the participation percentage conversation metric may be an equal share, or 100% divided by the number of people. Thus, when participation percentage conversation metric notifications are enabled, a person with less than one half of the ideal value may receive a "too quiet" notification; a person with greater than 1.5 times the ideal value may receive a "too garrulous" notification.

Information for more, fewer, or different conversation metrics may be presented in the user interface 510. For example, the scroll bar 580 may be used to scroll the user interface 510 and allow the user to see information for conversation metrics that are hidden.

Figure 6:
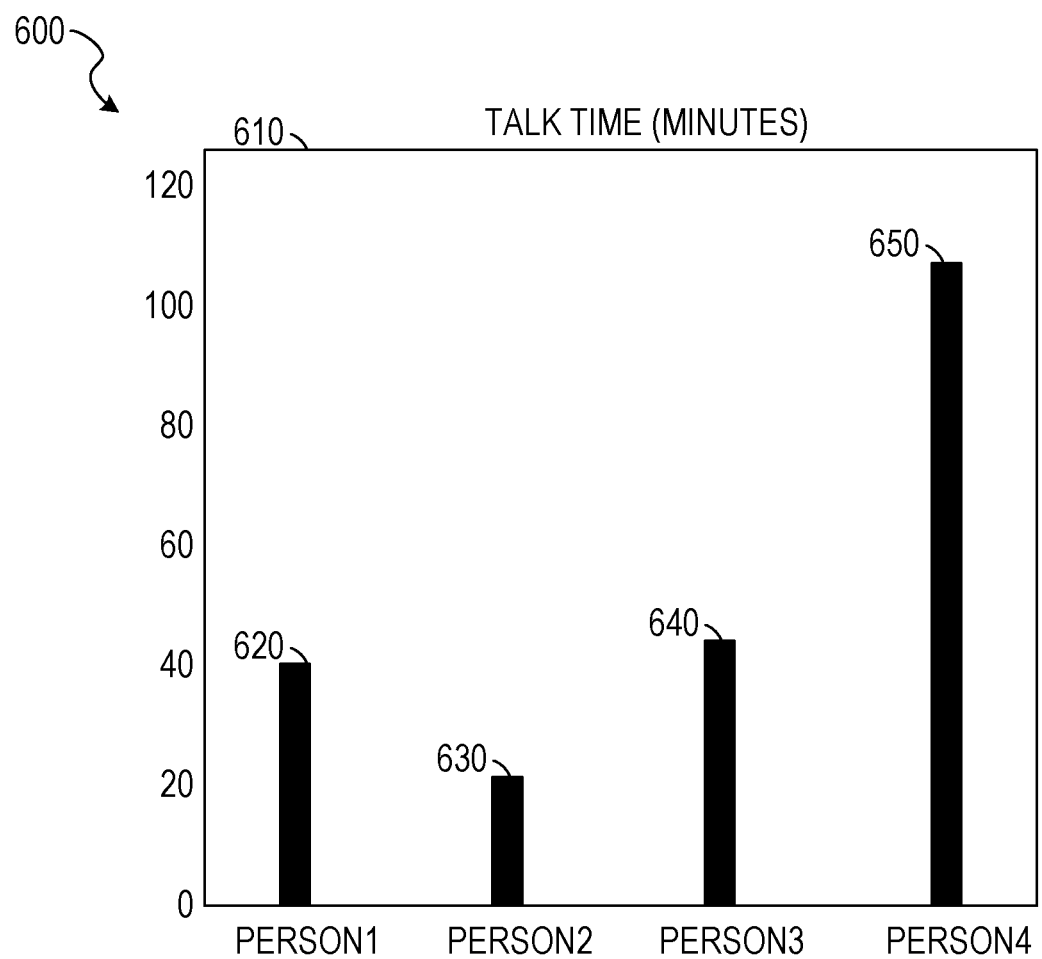
FIG. 6 is a block diagram illustration of a user interface of a device for metering conversations, according to some example embodiments.

FIG. 6 is a block diagram illustration of a user interface 600 of a device for metering conversations, according to some example embodiments. The user interface 600 includes a bar graph 610 with bars 620, 630, 640, and 650. Each of the bars 620-650 indicates the amount of time that a corresponding person has spoken during a conversation. Thus, the bar graph 610 provides a comparison of the conversation metric for each of the people. As shown in the example user interface 600, the first person has spoken for 40 minutes, the second person has spoken for 20 minutes, the third person has spoken for 45 minutes, and the fourth person has spoken for 105 minutes. In various example embodiments, bars for more or fewer people may be shown, bars for additional or different conversation metrics may be shown, or any suitable combination thereof. The user interface 600 is a graphical user interface, but other types of user interfaces are within the scope of the present disclosure.

Figure 7:
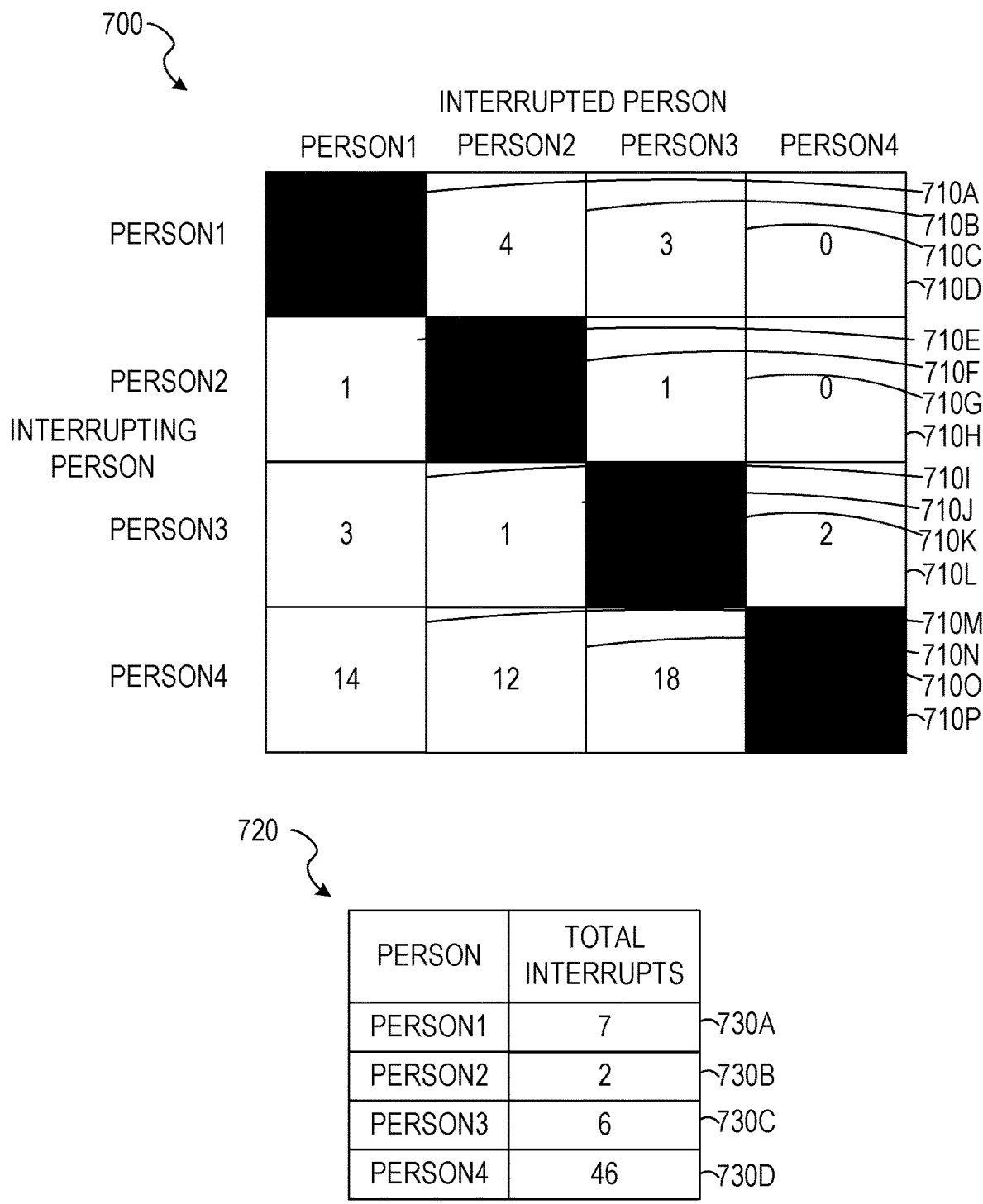
FIG. 7 is a block diagram illustration of user interfaces of a device for metering conversations, according to some example embodiments.

FIG. 7 is a block diagram illustration of user interfaces 700 and 720 of a device for metering conversations, according to some example embodiments. The user interface 700 includes a table with cells 710A, 710B, 710C, 710D, 710E, 710F, 710G, 710H, 710I, 710J, 710K, 710L, 710M, 710O, and 710P. The user interface 720 includes a table with rows 730A, 730B, 730C, and 730D. In various example embodiments, either or both of the user interfaces 700 and 720 may be presented to show results for an interruption conversation metric. While metrics for four people are shown in the user interfaces 700 and 720, the tables may be expanded or contracted to support any number of people. The user interfaces 700 and 720 are graphical user interfaces, but other types of user interfaces are within the scope of the present disclosure.

The table of the user interface 700 indicates the number of times each of four people interrupted each of the other three people. Since no person can interrupt themselves, the cells 710A, 710F, 710K, and 710P are blacked-out, to indicate no self-interruptions by each of the four people.

The table of the user interface 720 indicates the number of times each of the four people interrupted the other three people, in total. Thus, the value in the row 730A, indicating the total number of times the first person interrupted another person, is the sum of the values in the cells 710B-710D. As can be seen in the row 730D, the fourth person committed the most interruptions.

Figure 8:
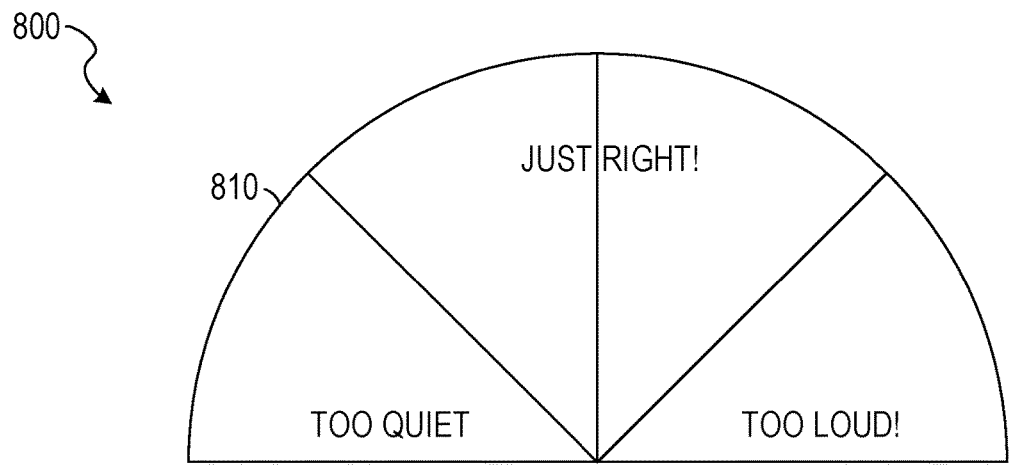
FIG. 8 is a block diagram illustration of a user interface of a device for metering conversations, according to some example embodiments.
Figure 8:
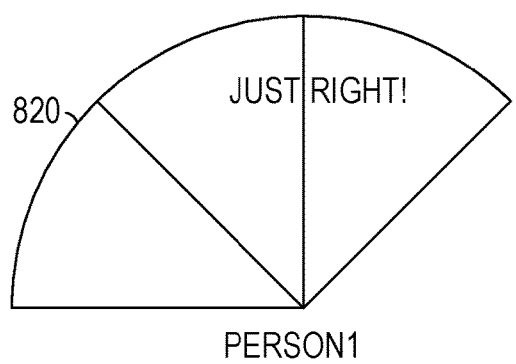
Figure 8:
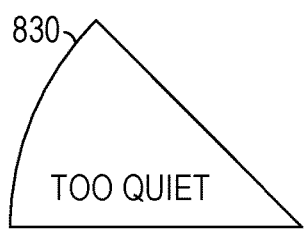
Figure 8:
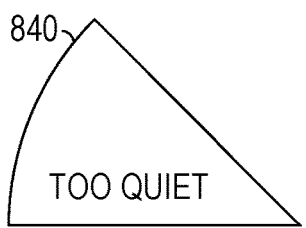
Figure 8:
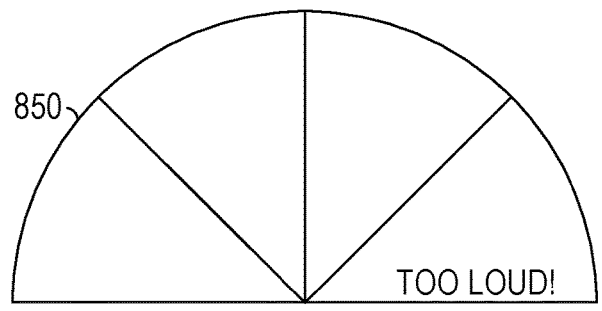

FIG. 8 is a block diagram illustration of a user interface 800 of a device for metering conversations, according to some example embodiments. The user interface 800 includes icons 810, 820, 830, 840, and 850. The user interface 800 may be presented to show results for a vocal volume conversation metric. While metrics for four people are shown in the user interface 800, metrics for any number of people may be shown. The vocal volume conversation metric may be determined by measuring the volume of sound detected during portions of a conversation in which the person being metered is speaking. The vocal volume conversation metric may be defined by the maximum vocal volume during the portions of the conversation in which the person is speaking, by the average vocal volume during the portions of the conversation in which the person is speaking, or any suitable combination thereof. The user interface 800 is a graphical user interface, but other types of user interfaces are within the scope of the present disclosure.

The icon 810 indicates the full range of possible vocal volumes. In some example embodiments, the icon 810 is color-coded. For example, the portion of the icon 810 labeled "too quiet" may be yellow, the portion labeled "just right" may be green, and the portion labeled "too loud!" may be red.

Each of the icons 820-850 indicates the vocal volume conversation metric for a different person. Rather than including the full range of possible vocal volumes, the icons 820-850 contain only the portion of the range that is less than or equal to the value of the conversation metric for the corresponding person. Additionally or alternatively, the vocal volume conversation metric for each person may be shown as text or as a numerical value. The icons 820-850 indicate the vocal volume conversation metrics in text as "too quiet," "just right!," or "too loud!." In other example embodiments, the vocal volume conversation metric may be shown as a loudness measure in decibels, as a percentage of an ideal vocal volume, or any suitable combination thereof.

Categorization for a person may be determined by comparing the vocal volume conversation metric to one or more predetermined thresholds. For example, a vocal volume conversation metric below 25% may fall within the range labeled "too quiet," a vocal volume conversation metric between 25% and 75% may fall within the range labeled "just right!," and a vocal volume conversation metric above 75% may fall within the range labeled "too loud!."

Figure 9:
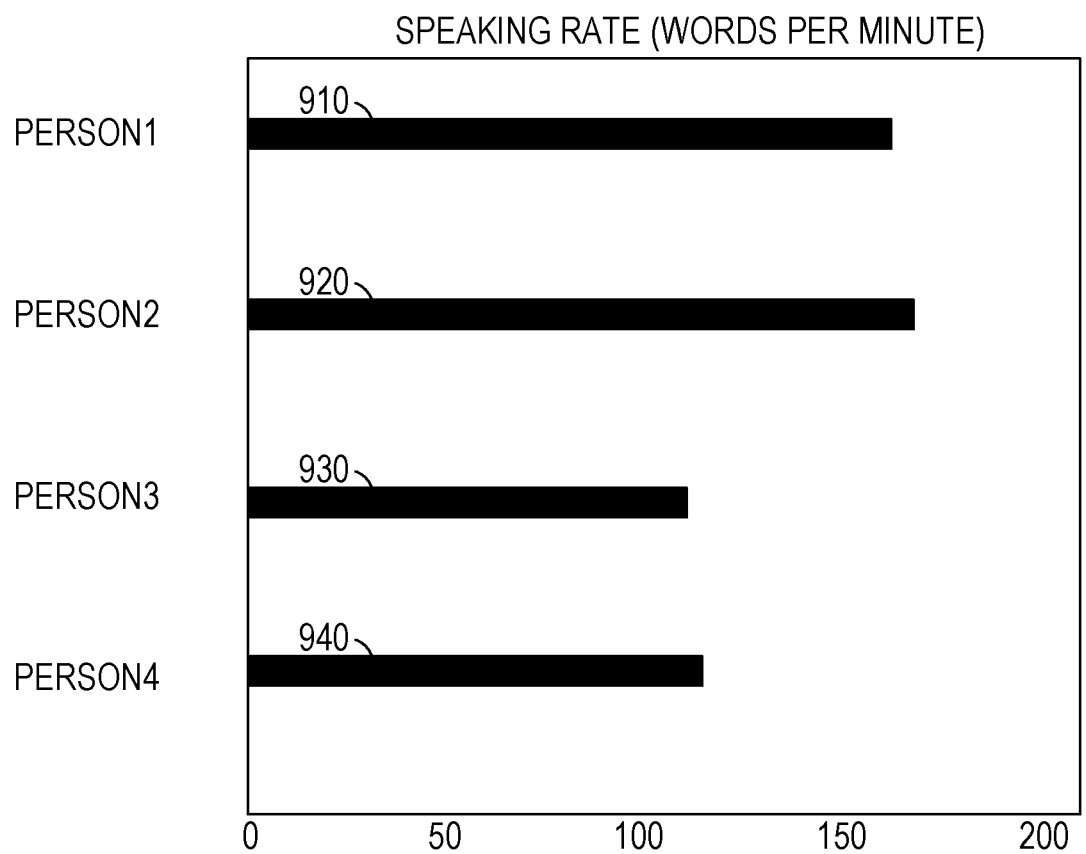
FIG. 9 is a block diagram illustration of a user interface of a device for metering conversations, according to some example embodiments.

FIG. 9 is a block diagram illustration of a user interface 900 of a device for metering conversations, according to some example embodiments. The user interface 900 includes bars 910, 920, 930, and 940. The user interface 900 may be presented to show results for a speaking rate conversation metric. While metrics for four people are shown in the user interface 900, metrics for any number of people may be shown. The user interface 900 is a graphical user interface, but other types of user interfaces are within the scope of the present disclosure.

Each of the bars 910-940 indicates the speaking rate of a corresponding person. As can be seen in FIG. 9, the first two people, corresponding to bars 910 and 920, have speaking rates between 150 and 200 words per minute; the last two people, corresponding to bars 930 and 940, have speaking rates between 100 and 150 words per minute. To determine the speaking rate, the total number of words spoken by each person may be divided by the total speaking time of the person to determine a speaking rate conversation metric for each person. The number of words spoken may be determined using speech recognition software.

Additionally or alternatively, the speaking rate conversation metric for each person may be shown as text or as a numerical value. For example, text indicating "too fast," "just right," or "too slow" may be presented for each person. In other example embodiments, the speaking rate conversation metric may be shown as a numerical word per minute count, as a percentage of an ideal speaking rate, or any suitable combination thereof.

Figure 10:
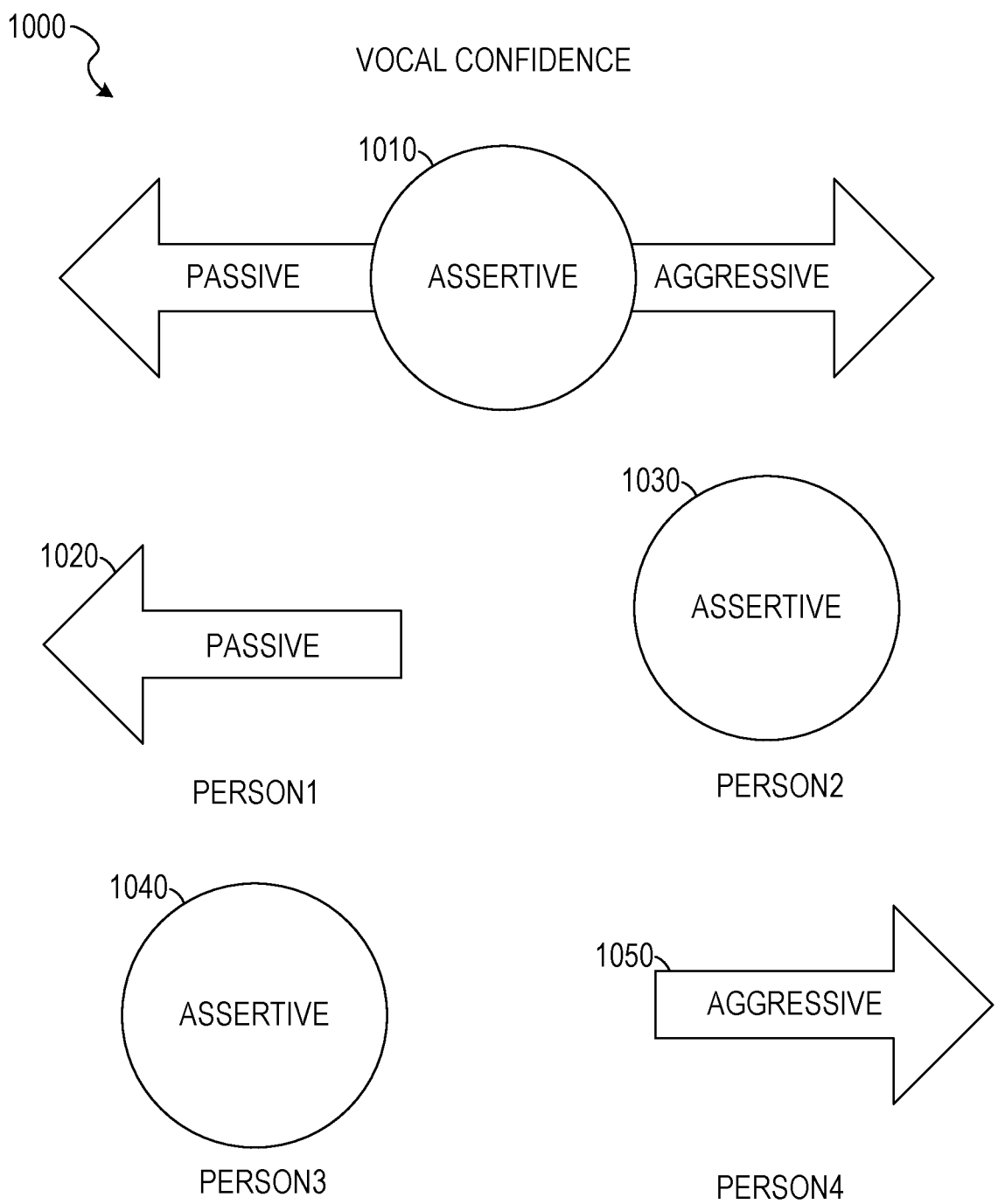
FIG. 10 is a block diagram illustration of a user interface of a device for metering conversations, according to some example embodiments.

FIG. 10 is a block diagram illustration of a user interface 1000 of a device for metering conversations, according to some example embodiments. The user interface 1000 includes icons 1010, 1020, 1030, 1040, and 1050. The user interface 1000 may be presented to show results for a vocal confidence conversation metric. While metrics for four people are shown in the user interface 1000, metrics for any number of people may be shown. In various example embodiments, different algorithms are used to determine the vocal confidence conversation metric. For example, a weighted combination of vocal loudness and response latency may be used as the vocal confidence conversation metric. The user interface 1000 is a graphical user interface, but other types of user interfaces are within the scope of the present disclosure.

The icon 1010 indicates the full range of possible vocal confidences. In some example embodiments, the icon 1010 is color-coded. For example, the portion of the icon 810 labeled "passive" may be yellow, the portion labeled "assertive" may be green, and the portion labeled "aggressive" may be red.

Each of the icons 1020-1050 indicates the vocal confidence conversation metric for a different person. Rather than including the full range of possible vocal volumes, the icons 1020-1050 contain only the portion of the range that is equal to the value of the conversation metric for the corresponding person. Additionally or alternatively, the vocal confidence conversation metric for each person may be shown as text or as a numerical value. The icons 1020-1050 indicate the vocal volume conversation metrics in text as "passive," "assertive," or "aggressive." In other example embodiments, the vocal confidence conversation metric may be shown as a percentage of an ideal vocal confidence conversation metric.

Figure 11:
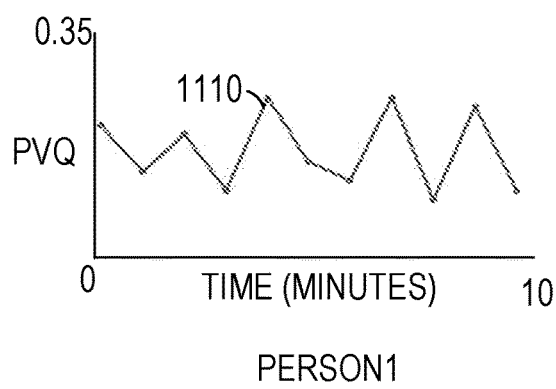
FIG. 11 is a block diagram illustration of a user interface of a device for metering conversations, according to some example embodiments.
Figure 11:
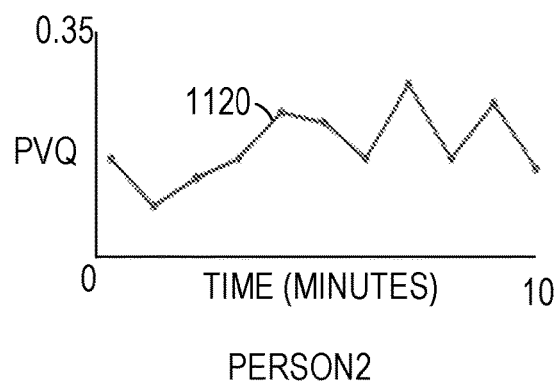
Figure 11:
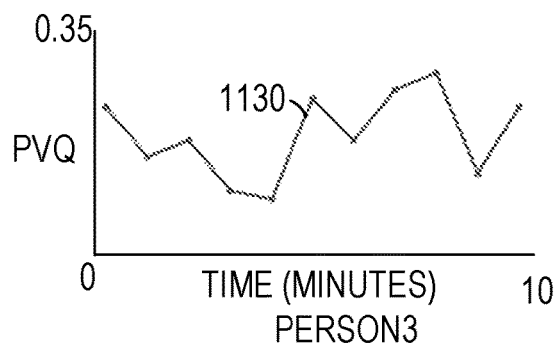
Figure 11:
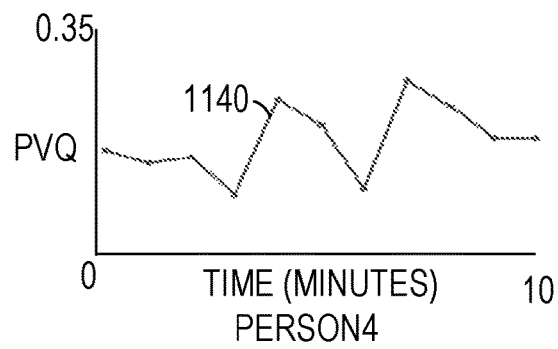

FIG. 11 is a block diagram illustration of a user interface 1100 of a device for metering conversations, according to some example embodiments. The user interface 1100 includes graphs 1110, 1120, 1130, and 1140. The user interface 1100 may be presented to show results for a vocal variety conversation metric. While metrics for four people are shown in the user interface 1100, metrics for any number of people may be shown. In various example embodiments, different algorithms are used to determine the vocal variety conversation metric. For example, a pitch variation quotient may be used as a vocal variety conversation metric. The user interface 1100 is a graphical user interface, but other types of user interfaces are within the scope of the present disclosure.

A pitch variation quotient is defined as the normalized standard deviation of fundamental frequency over a sample of speech (e.g., a 10-second, 15-second, or 30-second sample of speech). The fundamental frequency of speech is the inverse of the glottal pulse duration and varies as the person varies the pitch of the speech. Thus, from measurements of the glottal pulse durations and, implicitly, their variations over a speech sample, the mean and standard deviation of the fundamental frequency of the speech sample may be determined. The normalized standard deviation of fundamental frequency is the standard deviation divided by the mean fundamental frequency.

The graph 1110 shows the vocal variety of a first person, ranging from about 0.1 (or 10%) to about 0.2 (or 20%) over a 10-minute period. The graph 1120 shows the vocal variety of a second person, ranging from about 0.15 (or 15%) to about 0.3 (or 30%) over the 10-minute period. The graph 1130 shows the vocal variety of a third person, ranging from about 0.1 (or 10%) to about 0.25 (or 25%) over the 10-minute period. The graph 1140 shows the vocal variety of a fourth person, ranging from about 0.1 (or 10%) to about 0.3 (or 30%) over the 10-minute period.

Figure 12:
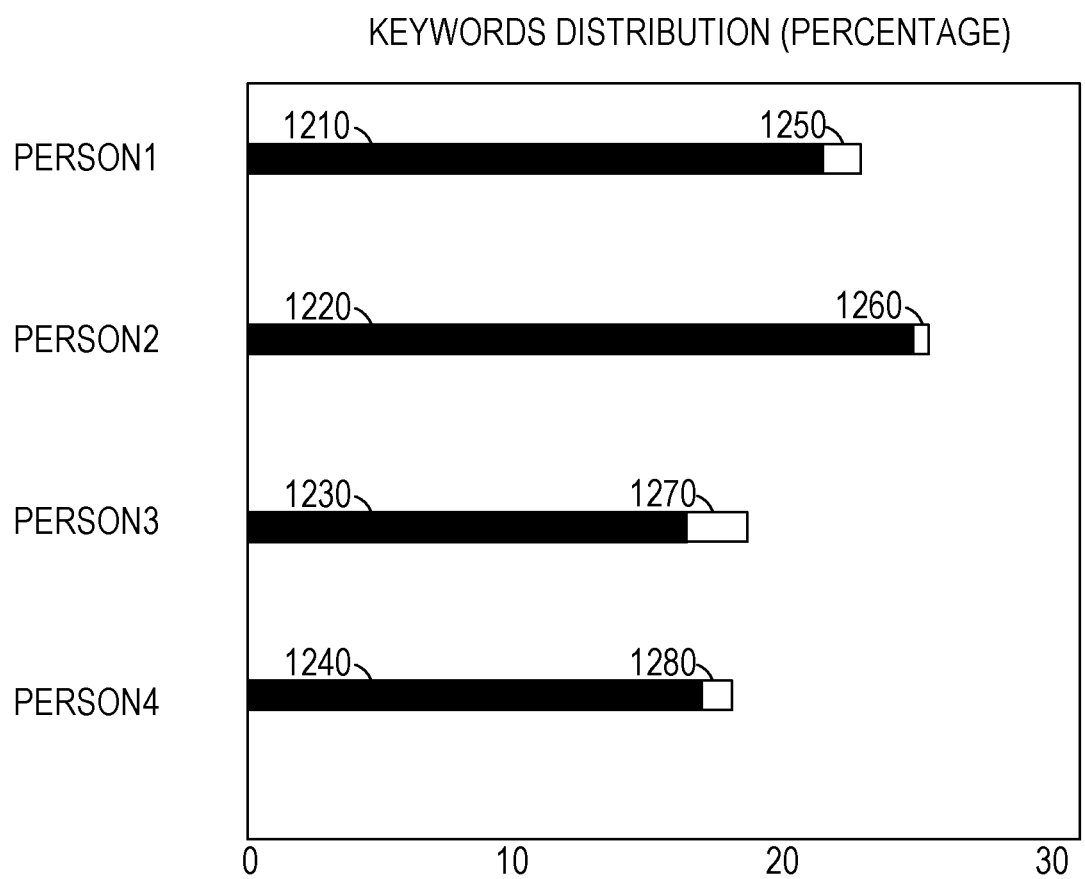
FIG. 12 is a block diagram illustration of a user interface of a device for metering conversations, according to some example embodiments.

FIG. 12 is a block diagram illustration of a user interface 1200 of a device for metering conversations, according to some example embodiments. The user interface 1200 includes bars 1210, 1220, 1230, 1240, 1250, 1260, 1270, and 1280. The user interface 1200 may be presented to show results for a keywords conversation metric. While metrics for four people are shown in the user interface 1200, metrics for any number of people may be shown. In various example embodiments, different algorithms are used to determine the keywords conversation metric. For example, the words of each person may be compared to a dictionary of predefined keywords to identify the keywords spoken by the person. The count of those keywords for each person may be divided by the total number of words spoken by the person to determine keywords percentage. Example predefined keywords include a list of topic-specific words, a list of impolite words, or any suitable combination thereof. The user interface 1200 is a graphical user interface, but other types of user interfaces are within the scope of the present disclosure.

The bars 1210-1240 show the percentage of total words spoken that are not keywords by each of the four people. The bars 1250-1280 show the percentage of total words spoken that are keywords by each of the four people. Thus, in the example of FIG. 12, each person has used mostly non-keyword words, and the third person has used the greatest number of keywords, shown by the bar 1270 being larger than the bars 1250, 1260, and 1280.

Additionally or alternatively, the keywords conversation metric for each person may be shown as text or as a numerical value. For example, text indicating "too rude," "just right," or "too polite" may be presented for each person. In other example embodiments, the key words conversation metric may be shown as a numerical keyword per minute count, as a percentage of total words spoken, or any suitable combination thereof.

Figure 13:
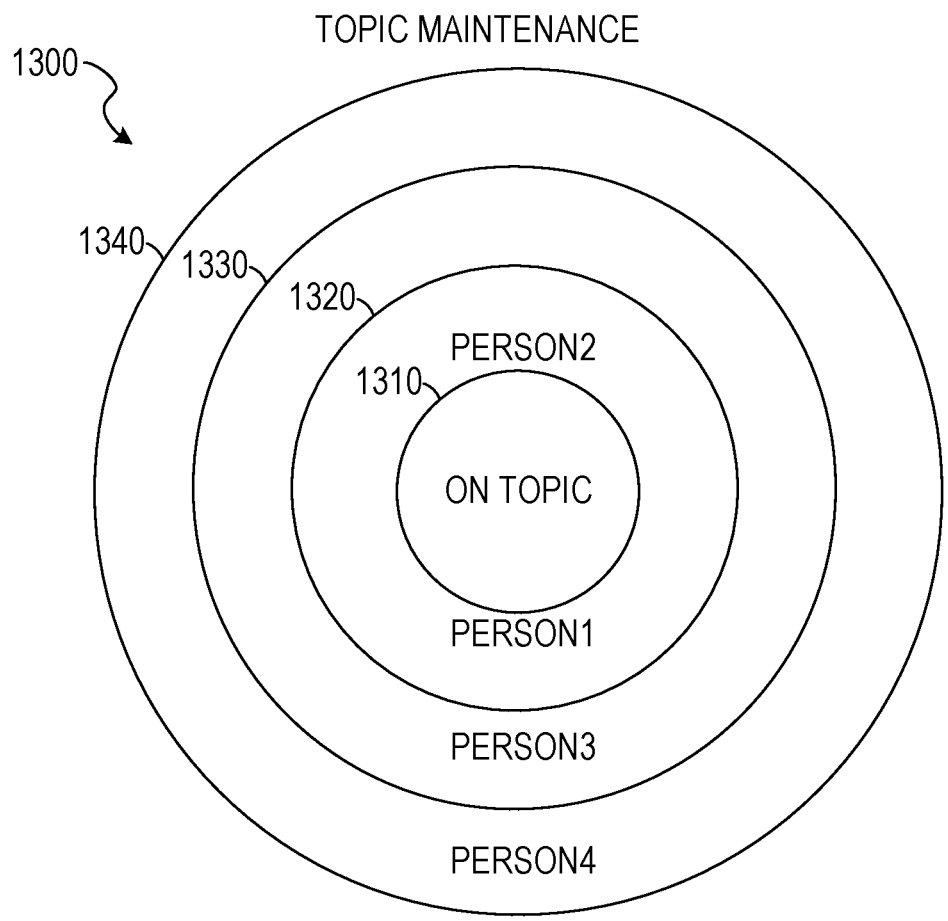
FIG. 13 is a block diagram illustration of a user interface of a device for metering conversations, according to some example embodiments.

FIG. 13 is a block diagram illustration of a user interface 1300 of a device for metering conversations, according to some example embodiments. The user interface 1300 includes the areas 1310, 1320, 1330, and 1340. The user interface 1300 may be presented to show results for a topic maintenance conversation metric. While metrics for four people are shown in the user interface 1300, metrics for any number of people may be shown. In various example embodiments, different algorithms are used to determine the topic maintenance conversation metric. For example, the words of the conversation may be analyzed to determine a dominant topic. Then, the words of each person may be analyzed to determine the percentage of the person's words that regard the dominant topic. The resulting percentage may be used as a topic maintenance score for the person. In the user interface 1300, each person's topic maintenance score is shown in a graphical form as falling within one of four ranges. The user interface 1300 is a graphical user interface, but other types of user interfaces are within the scope of the present disclosure.

The areas 1310-1340 together may form an image of a dartboard. In some example embodiments, a dart is shown that hits the bullseye. The area 1310 represents a range of topic maintenance scores that are close to 100%. The areas 1320-1340 represent ranges of topic maintenance scores that are progressively farther from 100% as they are progressively farther from the center of the dartboard. For example, the area 1310 may represent a topic maintenance score of 80%-100%, the area 1320 may represent a topic maintenance score of 60%-80%, the area 1330 may represent a topic maintenance score of 40%-60%, and the area 1340 may represent a topic maintenance score below 40%.

In some example embodiments, the areas 1310-1340 are color-coded. For example, the area 1310 may be green, the area 1320 may be blue, the area 1330 may be yellow, and the area 1340 may be red. As shown in the user interface 1300, the first two people have topic maintenance scores that fall within the range corresponding to the area 1320, the third person has a topic maintenance score that falls within the range corresponding to the area 1330, and the fourth person has a topic maintenance score that falls within the range corresponding to the area 1340.

Additionally or alternatively, the topic maintenance conversation metric for each person may be shown as text or as a numerical value. For example, text indicating "off topic" or "on topic" may be presented for each person. In other example embodiments, the topic maintenance conversation metric may be shown as a numerical on topic percentage of total words spoken.

Figure 14:
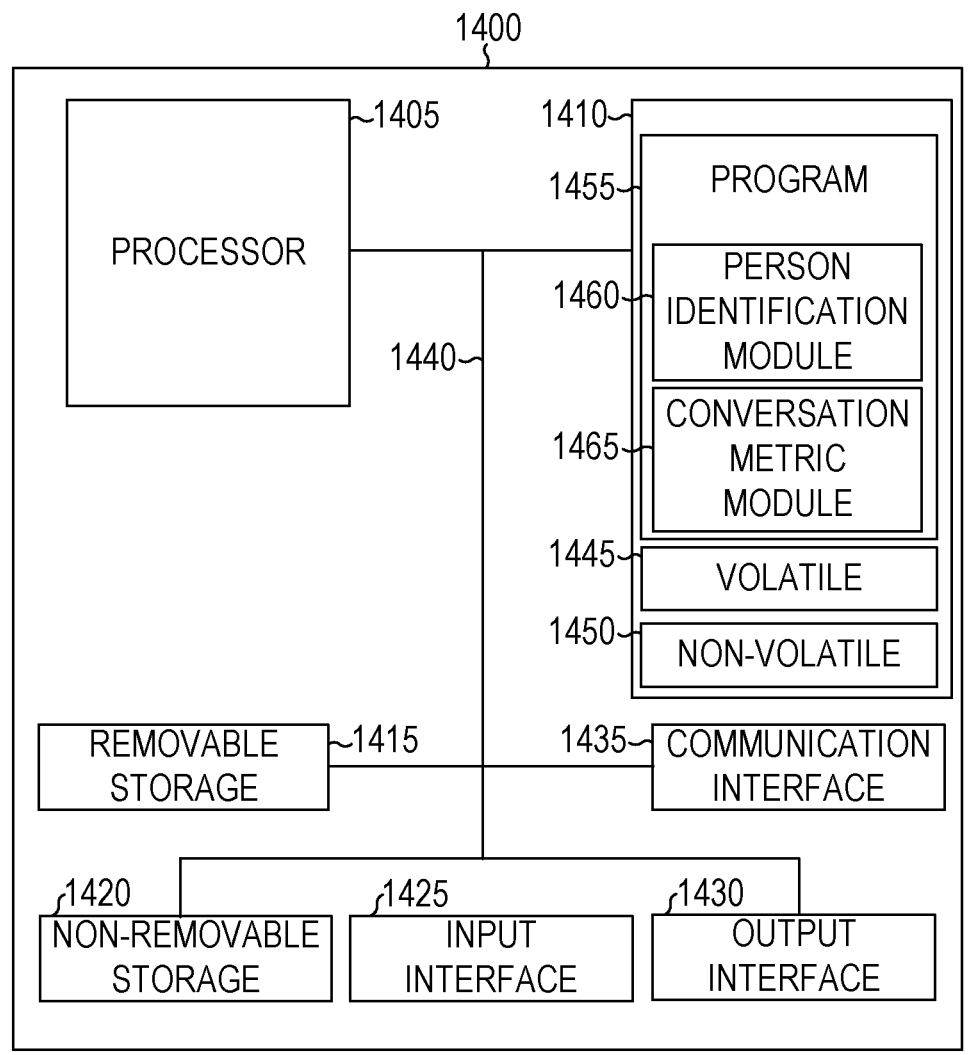
FIG. 14 is a block diagram illustrating circuitry for clients and servers that implement algorithms and perform methods, according to some example embodiments.

FIG. 14 is a block diagram illustrating circuitry for implementing algorithms and performing methods, according to example embodiments. All components need not be used in various embodiments. For example, clients, servers, and cloud-based network resources may each use a different set of components or, in the case of servers, for example, larger storage devices.

One example computing device in the form of a computer 1400 (also referred to as computing device 1400 and computer system 1400) may include a processor 1405, memory storage 1410, removable storage 1415, and non-removable storage 1420, all connected by a bus 1440. Although the example computing device is illustrated and described as the computer 1400, the computing device may be in different forms in different embodiments. For example, the computing device may instead be a smartphone, a tablet, a smartwatch, or another computing device including elements the same as or similar to those illustrated and described with regard to FIG. 14. Devices, such as smartphones, tablets, and smartwatches, are generally collectively referred to as "mobile devices" or "user equipment." Further, although the various data storage elements are illustrated as part of the computer 1400, the storage may also or alternatively include cloud-based storage accessible via a network, such as the Internet, or server-based storage.

The memory storage 1410 may include volatile memory 1445 and non-volatile memory 1450, and may store a program 1455. The computer 1400 may include—or have access to a computing environment that includes—a variety of computer-readable media, such as the volatile memory 1445, the non-volatile memory 1450, the removable storage 1415, and the non-removable storage 1420. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 1400 may include or have access to a computing environment that includes input interface 1425, output interface 1430, and a communication interface 1435. The output interface 1430 may interface to or include a display device, such as a touchscreen, that also may serve as an input device. The output interface 1430 may interface to or include a non-visual output device, such as a speaker, a haptic device, or a suitable combination thereof. The input interface 1425 may interface to or include one or more of a touchscreen, a touchpad, a mouse, a keyboard, a camera, one or more device-specific buttons, one or more sensors integrated within or coupled via wired or wireless data connections to the computer 1400, and other input devices. The computer 1400 may operate in a networked environment using the communication interface 1435 to connect to one or more remote computers, such as database servers. The remote computer may include a personal computer (PC), server, router, network PC, peer device or other common network node, or the like. The communication interface 1435 may connect to a local area network (LAN), a wide area network (WAN), a cellular network, a WiFi network, a Bluetooth network, or other networks.

Computer-readable instructions stored on a computer-readable medium (e.g., the program 1455 stored in the memory 1410) are executable by the processor 1405 of the computer 1400. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 1455 is shown as including a person identification module 1460 and a conversation metric module 1465. Any one or more of the modules described herein may be implemented using hardware (e.g., a processor of a machine, an ASIC, FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The person identification module 1460 is configured to identify people in a conversation. For example, the input interface 1425 may receive audio data from a microphone, the communication interface 1435 may receive audio data of a recorded conversation over a network, audio data of a recorded conversation may be accessed from removable storage 1415 or non-removable storage 1420, or any suitable combination thereof. The person identification module 1460 accesses the audio data and determines which portions of the audio data are associated with individual people. In some example embodiments, the person identification module 1460 associates portions of the audio data with individual people based on acoustic features, prosodic features, conversational features, lexical features, or any suitable combination thereof.

The conversation metric module 1465 is configured to determine conversation metrics for each of the people identified by the person identification module 1460. For example, the conversation metric module 1465 may determine conversation metrics for one or more of interruptions, participation, vocal volume, talk time, speaking rate, vocal confidence, vocal variety, keywords, and topic maintenance. The determined conversation metrics may be sent via the output interface 1430 to a display device for presentation to a user. In some example embodiments, the determined conversation metrics are sent via the communication interface 1435 to another device for presentation to a user.

Figure 15:
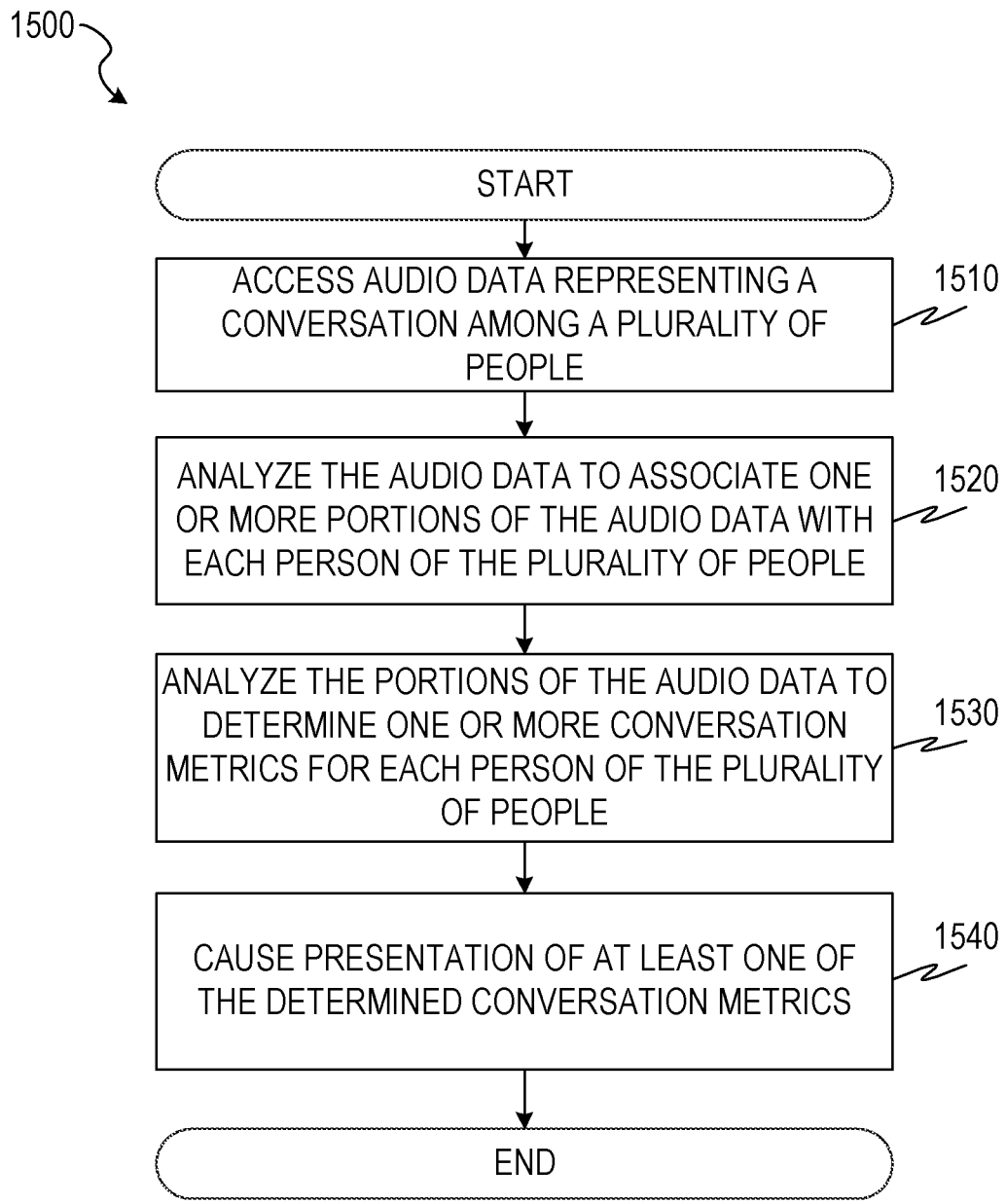
FIG. 15 is a flowchart illustration of a method of metering conversations, according to some example embodiments.

FIG. 15 is a flowchart illustration of a method 1500 of metering conversations, according to some example embodiments. The method 1500 includes the operations 1510, 1520, 1530, and 1540. By way of example and not limitation, the method 1500 is described as being performed by elements of the computer 1400, described above with respect to FIG. 14.

In operation 1510, the person identification module 1460 accesses audio data representing a conversation among a plurality of people. For example, the audio data may be received from a microphone connected to the computer 1400 located in a room in which the conversation is occurring. As another example, the audio data may be received from a plurality of smartphones, each of which provides audio data gathered from one or more people speaking into the smartphone.

In operation 1520, the person identification module 1460 analyzes the audio data to associate one or more portions of the audio data with each person of the plurality of people. For example, the person identification module 1460 may analyze the audio data to identify acoustic features, prosodic features, conversational features, lexical features, or any suitable combination thereof. Based on similarities and differences in the identified features between various portions of the audio data, the portions may be determined to contain speech produced by the same or different people.

In operation 1530, the conversation metric module 1465 analyzes the portions of the audio data to determine one or more conversation metrics for each person of the plurality of people. For example, the number of words spoken in the portions associated with a first person may be counted to determine a word count for the first person. By repeating this process for each person, a word count metric is determined for each of the different people.

In operation 1540, the conversation metric module 1465 causes presentation of at least one of the determined conversation metrics. For example, a device associated with each person (e.g., each person's smartphone) may receive a graphical depiction of the conversation metric for the person from the conversation metric module 1465 via a network. Each device may display the received graphical depiction, allowing each of the people to see their own conversation metric. In another example, the computer 1400 is a shared device that includes or is attached to a display screen. The conversation metric module 1465 may cause the conversation metrics for all of the people to be displayed simultaneously or sequentially on the display screen. For example, any one or more of the user interfaces of FIGS. 4-13 may be displayed.

In some example embodiments, the presentation of the at least one of the determined conversation metrics includes providing haptic feedback. For example, a wearable device (e.g., a smartwatch) associated with a person may be instructed by the conversation metric module 1465 to vibrate in response to a determination that a conversation metric of the person exceeds or falls short of a predetermined threshold. In some example embodiments, the haptic feedback is provided when the conversation metric module 1465 determines that the person is speaking too loudly (e.g., that a vocal volume conversation metric of the person exceeds a threshold), that the person is speaking too rudely (e.g., that an impolite keywords conversation metric of the person exceeds a threshold), that the person is interrupting excessively (e.g., that an interruption conversation metric of the person exceeds a threshold), that the person is speaking too monotonously (e.g., that a vocal variety conversation metric of the person falls below a threshold), or any suitable combination thereof.

Figure 16:
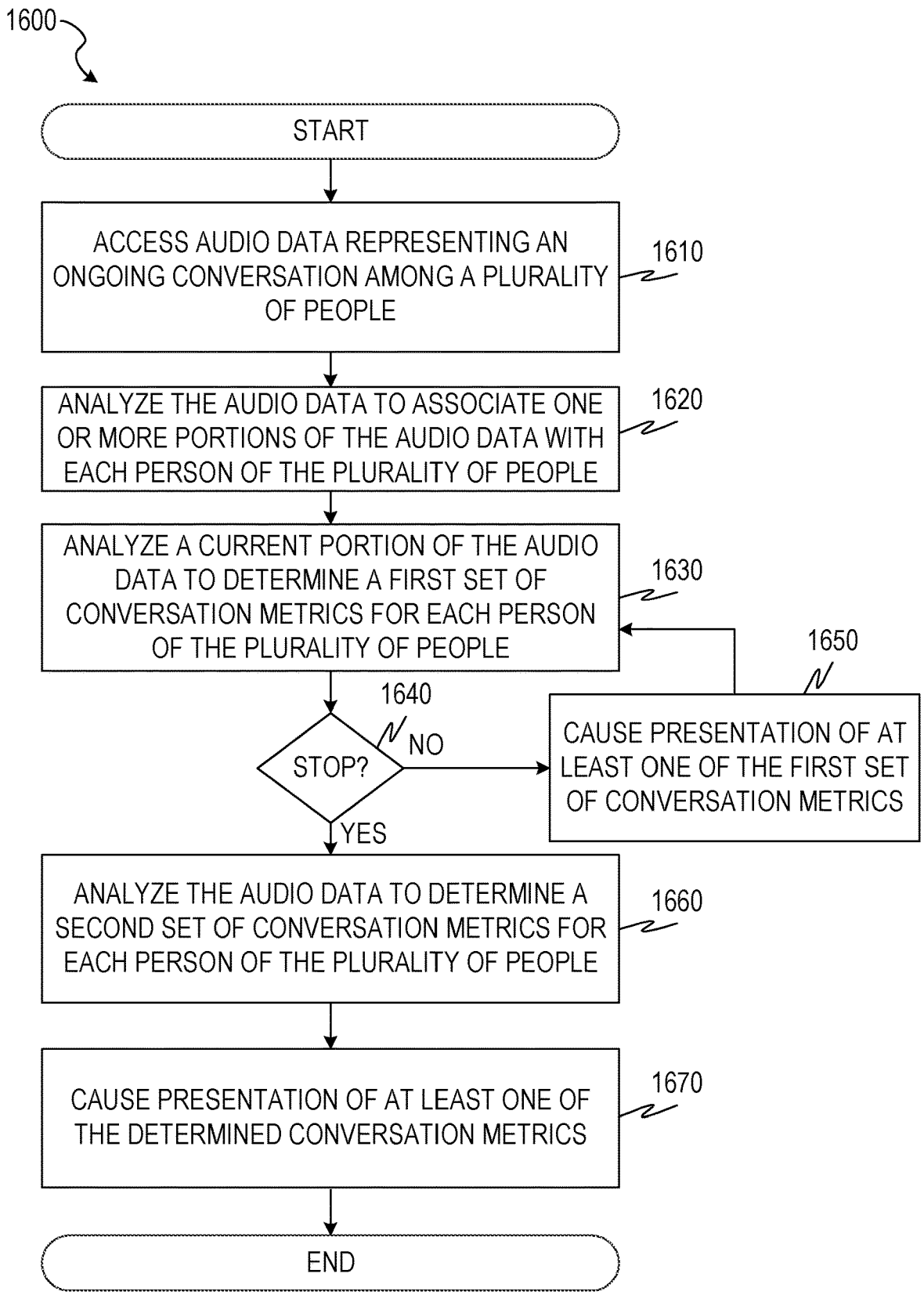
FIG. 16 is a flowchart illustration of a method of metering conversations, according to some example embodiments.

FIG. 16 is a flowchart illustration of a method 1600 of metering conversations, according to some example embodiments. The method 1600 includes operations 1610, 1620, 1630, 1640, 1650, 1660, and 1670. By way of example and not limitation, the method 1600 is described as being performed by elements of the computer 1400, described above with respect to FIG. 14.

In operation 1610, the person identification module 1460 accesses audio data representing a conversation among a plurality of people. For example, the audio data may be received over a network from a computer that is recording the conversation. As another example, separate portions of audio data may be received over a network from multiple smartphones used in the conversation. In operation 1620, the person identification module 1460 analyzes the audio data to associate one or more portions of the audio data with each person of the plurality of people.

In operation 1630, the conversation metric module 1465 analyzes a current portion of the audio data to determine a first set of conversation metrics for each person of the plurality of people. For example, the number of times the first person interrupts other people may be counted to determine an interruption conversation metric for the first person. By repeating this process for each person, an interruption conversation metric is determined for each of the different people. As another example, the total number of words spoken by each person may be divided by the total speaking time of the person to determine a speaking rate conversation metric for each person. The current portion of the audio data analyzed in operation 1630 may be a preceding segment of the audio data (e.g., the previous five minutes) or the entirety of the audio data received prior to the operation 1630.

In operation 1640, the conversation metric module 1465 determines whether to stop the analysis or not. For example, a user may have pressed the power button 220 or the microphone button 230 (both shown in FIG. 2) to stop analysis of the conversation. As another example, a predetermined maximum conversation time (e.g., thirty minutes, one hour, or two hours) may have been reached, causing the analysis to stop. If the determination to stop is made, the process 1600 continues with the operation 1660. Otherwise, the process 1600 continues with the operation 1650.

In operation 1650, the conversation metric module 1465 causes presentation of at least one of the first set of conversation metrics. For example, any one or more of the user interfaces of FIGS. 4-13 may be displayed. After operation 1650, the process 1600 continues with the operation 1630, continuing the analysis of the conversation. Provision of conversation metrics during the conversation may be referred to as an online mode of conversation metering.

In operation 1660, the conversation metric module 1465 analyzes the audio data to determine a second set of conversation metrics for each person of the plurality of people. The second set of conversation metrics may be different from the first set of conversation metrics. For example, the first set of conversation metrics may include metrics for talk time, participation, interrupts, speaking rate, vocal volume, and specific keywords, and the second set of conversation metrics may include metrics for topic maintenance, vocal confidence, and vocal variety.

The conversation metrics selected for the second set of conversation metrics may be those that require the entire conversation to be complete to be generated, those that use additional computing power to generate, or those that are more useful as after-conversation feedback than as hints to change behavior during a conversation. For example, a person may be informed by display of the first set of conversation metrics that he or she is interrupting too much and make an effort to reduce interruptions, but informing the person that they need more vocal confidence in the middle of the conversation may only serve to reduce the person's effectiveness further. Provision of conversation metrics after the conversation is complete may be referred to as an offline mode of conversation metering.

Figure 17:
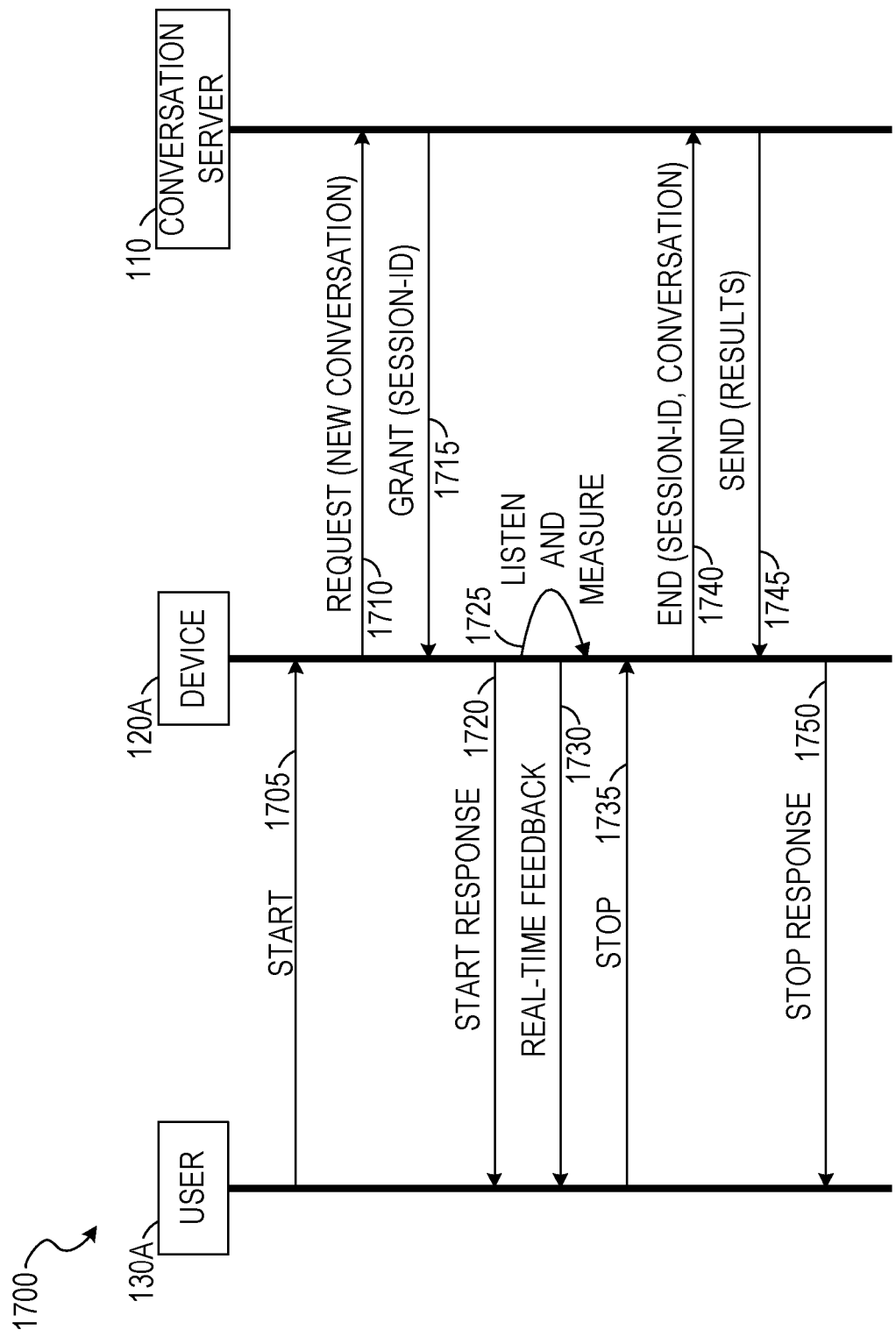
FIG. 17 is a communication diagram for a method of metering conversations, according to some example embodiments.

FIG. 17 is a communication diagram 1700 for a method of metering conversations, according to some example embodiments. The communication diagram 1700 includes user interface inputs 1705 and 1735, user interface outputs 1720, 1730, and 1750, messages 1710, 1715, 1740, and 1745 and the operation 1725. By way of example and not limitation, the user interface inputs 1705 and 1735 are shown as being received from the user 130A, the operation 1725 is shown as being performed by the device 120A, and the messages 1710, 1715, 1740, and 1745 are shown as being communicated between the device 120A and the conversation server 110. As shown in the example configuration 100 of FIG. 1, the conversation server 110 may be remote from the device 120A, connected via the network 140. As shown in the example configuration 150 of FIG. 1, the device 160 may perform the operations of both the conversation server 110 and the device 120A.

The user 130A initiates the conversation metering via the user interface input 1705, labeled "start." For example, the user 130A may press the button 230 of FIG. 2 to activate a microphone of a computer 1400 of FIG. 14. In response to receiving the user interface input 1705, the device 120A transmits the message 1710 to the conversation server 110, requesting that the conversation server create a data structure for a new conversation. For example, the conversation server 110 may create an entry in a database for the conversation and assign a unique identifier to the conversation.

The conversation server 110 responds to the request from the device 120A by sending the message 1715. The message 1715 includes a unique identifier for the conversation, referred to in FIG. 17 as a "session-id." After receiving the message 1715, the device 120A provides user interface output 1720, indicating to the user 130A that the request to start conversation metering was successful.

In operation 1725, the device 120A listens to the conversation and generates a first set of conversation metrics. One or more of the first set of conversation metrics are provided to the user via the user interface output 1730, labeled "real-time feedback." The operation 1725 continues, with periodic updating of the conversation metrics provided to the user, until a message 1735, labeled "stop," is received from the user 130A. For example, the user 130A may press the button 230 of FIG. 2 a second time to deactivate the microphone.

In response to receiving the user interface input 1735, the device 120A transmits the message 1740 to the conversation server 110. The message 1740 includes the conversation identifier and the audio data for the recorded conversation. The conversation server 110 processes the audio data to generate a second set of conversation metrics, which are sent to the device 120A in the message 1745. In response to the message 1745, the device 120A presents the user interface output 1750 to the user, including one or more of the conversation metrics of the second set of conversation metrics.

FIG. 18 is a communication diagram 1800 for a method of metering conversations, according to some example embodiments. The communication diagram 1800 includes a user interface input 1810, a user interface output 1840, a message 1820, and the operation 1830. By way of example and not limitation, the user interface input 1810 is shown as being received from the user 130A, the operation 1830 is shown as being performed by the device 120A, and the message 1820 is shown as being communicated from the device 120A to the conversation server 110.

The user 130A attempts to initiate the conversation metering via the user interface input 1810, labeled "start." For example, the user 130A may press the button 230 of FIG. 2 to activate a microphone of a computer 1400 of FIG. 14. In response to receiving the user interface input 1810, the device 120A transmits the message 1820 to the conversation server 110, requesting that the conversation server create a data structure for a new conversation. In operation 1830, the device 120A waits for a predetermined period of time for an expected response message from the conversation server 110 (e.g., the message 1715 of FIG. 17). In response to the predetermined period of time elapsing without receiving the expected response message, the device 120A presents the user interface output 1840 to the user 130A, indicating that no connection to the conversation server 110 could be made.

Devices and methods disclosed herein may provide improved conversation metering for conversations between multiple people. Use of devices and methods disclosed herein may enable individuals and organizations to improve effective human speech communication. Use of one or more of the user interfaces disclosed herein may enable users to more quickly or intuitively understand conversation metrics and make appropriate adjustments.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A conversation meter comprising:
   a memory storage comprising instructions; and
   one or more processors in communication with the memory storage, wherein the one or more processors execute the instructions to perform:

accessing audio data representing a conversation among a plurality of people;

analyzing the audio data to associate one or more portions of the audio data with each person of the plurality of people;

analyzing the portions of the audio data to determine one or more conversation metrics for each person of the plurality of people, the one or more conversation metrics comprising an average vocal volume during the portions of the conversation in which the person is speaking, the analyzing comprising determining a vocal confidence based on a combination of vocal volume and response latency; and causing presentation of at least one of the determined conversation metrics.

2. The conversation meter of claim 1, wherein the causing of the presentation of the at least one of the determined conversation metrics comprises:

causing a first device associated with a first person of the plurality of people to present the at least one of the determined conversation metrics for the first person; and causing a second device associated with a second person of the plurality of people to present the at least one of the determined conversation metrics for the second person.

3. The conversation meter of claim 1, wherein:

the causing of the presentation of the at least one of the determined conversation metrics comprises causing presentation of a comparison of a first determined conversation metric for each person of the plurality of people.

4. The conversation meter of claim 1, wherein:

the causing of the presentation of the at least one of the determined conversation metrics comprises generating haptic feedback on a wearable device.

5. The conversation meter of claim 1, wherein:

the analyzing of the portions of the audio data to determine the one or more conversation metrics comprises rating topic maintenance.

6. The conversation meter of claim 1, wherein:

the analyzing of the portions of the audio data to determine the one or more conversation metrics comprises determining a participation percentage.

7. The conversation meter of claim 1, wherein:

the analyzing of the portions of the audio data to determine the one or more conversation metrics comprises determining an interrupt count.

8. The conversation meter of claim 1, wherein:

the analyzing of the portions of the audio data to determine the one or more conversation metrics comprises determining a speaking rate.

9. The conversation meter of claim 1, wherein:

the analyzing of the portions of the audio data to determine the one or more conversation metrics comprises determining a vocal variety.

10. The conversation meter of claim 1, wherein:

the analyzing of the portions of the audio data to determine the one or more conversation metrics comprises determining a number of predefined keywords.

11. The conversation meter of claim 1, wherein:

the accessing of the audio data representing the conversation occurs during the conversation.

12. A computer-implemented method of metering a conversation comprising:

accessing, by one or more processors, audio data representing a conversation among a plurality of people;

analyzing, by the one or more processors, the audio data to associate one or more portions of the audio data with each person of the plurality of people;

analyzing, by the one or more processors, the portions of the audio data to determine one or more conversation metrics for each person of the plurality of people, the one or more conversation metrics comprising an average vocal volume during the portions of the conversation in which the person is speaking, the analyzing comprising determining a vocal confidence based on a combination of vocal volume and response latency; and causing, by the one or more processors, presentation of at least one of the determined conversation metrics.

13. The computer-implemented method of claim 12, wherein the causing of the presentation of the at least one of the determined conversation metrics comprises:

causing a first device associated with a first person of the plurality of people to present the at least one of the determined conversation metrics for the first person; and causing a second device associated with a second person of the plurality of people to present the at least one of the determined conversation metrics for the second person.

14. The computer-implemented method of claim 12, wherein:

the causing of the presentation of the at least one of the determined conversation metrics comprises causing presentation of a comparison of a first determined conversation metric for each person of the plurality of people.

15. The computer-implemented method of claim 12, wherein:

the causing of the presentation of the at least one of the determined conversation metrics comprises generating haptic feedback on a wearable device.

16. The computer-implemented method of claim 12, wherein:

the analyzing of the portions of the audio data to determine the one or more conversation metrics comprises rating topic maintenance.

17. The computer-implemented method of claim 12, wherein:

the analyzing of the portions of the audio data to determine the one or more conversation metrics comprises determining a participation percentage.

18. A non-transitory computer-readable medium storing computer instructions for metering a conversation, that when executed by one or more processors, cause the one or more processors to perform steps of:

accessing audio data representing a conversation among a plurality of people;

analyzing the audio data to associate one or more portions of the audio data with each person of the plurality of people;

analyzing the portions of the audio data to determine one or more conversation metrics for each person of the plurality of people, the one or more conversation metrics comprising an average vocal volume during the portions of the conversation in which the person is speaking, the analyzing comprising determining a vocal confidence based on a combination of vocal volume and response latency; and causing presentation of at least one of the determined conversation metrics.

* * * * *